(12) United States Patent
Kanki

(10) Patent No.: US 11,867,299 B2
(45) Date of Patent: Jan. 9, 2024

(54) FLOW PATH SWITCHING VALVE

(71) Applicant: DENSO CORPORATION, Kariya (JP)

(72) Inventor: Jun Kanki, Kariya (JP)

(73) Assignee: DENSO CORPORATION, Kariya (JP)

( * ) Notice: Subject to any disclaimer, the term of this patent is extended or adjusted under 35 U.S.C. 154(b) by 150 days.

(21) Appl. No.: 17/672,892

(22) Filed: Feb. 16, 2022

(65) Prior Publication Data

US 2022/0307614 A1 Sep. 29, 2022

(30) Foreign Application Priority Data

Mar. 23, 2021 (JP) .................. 2021-048304

(51) Int. Cl.
| | | |
|---|---|---|
| F16K 11/08 | (2006.01) | |
| F16K 11/07 | (2006.01) | |
| F16K 27/06 | (2006.01) | |
| F16K 11/076 | (2006.01) | |
| F16K 11/085 | (2006.01) | |
| F16K 11/087 | (2006.01) | |
| F16K 31/04 | (2006.01) | |
| F16K 11/10 | (2006.01) | |
| F16K 31/53 | (2006.01) | |

(52) U.S. Cl.
CPC ........ *F16K 11/076* (2013.01); *F16K 11/0856* (2013.01); *F16K 11/0873* (2013.01); *F16K 11/10* (2013.01); *F16K 27/067* (2013.01); *F16K 31/041* (2013.01); *F16K 31/535* (2013.01)

(58) Field of Classification Search
CPC ............... F16K 11/076; F16K 11/0856; F16K 11/0873; F16K 27/067; F16K 31/04
See application file for complete search history.

(56) References Cited

U.S. PATENT DOCUMENTS

| | | | | |
|---|---|---|---|---|
| 2008/0302111 | A1* | 12/2008 | Batenburg | .............. F04B 51/00 417/313 |
| 2016/0010536 | A1 | 1/2016 | Murakami et al. | |
| 2017/0175611 | A1* | 6/2017 | Wakamoto | ................ F01P 3/02 |
| 2019/0219179 | A1 | 7/2019 | Sato | |
| 2020/0109787 | A1 | 4/2020 | Tsuji | |
| 2020/0114725 | A1 | 4/2020 | Kanzaki | |
| 2022/0389680 | A1* | 12/2022 | Fukuda | ................. E02F 9/2083 |

FOREIGN PATENT DOCUMENTS

JP 2016-113956 6/2016

* cited by examiner

*Primary Examiner* — Kevin R Barss
(74) *Attorney, Agent, or Firm* — Nixon & Vanderhye P.C.

(57) ABSTRACT

A flow path switching valve is used in an engine water cooling system mounted on a mounting surface of an engine, and switches a flow path of a cooling water in the engine water cooling system. The engine water cooling system has a block jacket formed on a cylinder block and a head jacket formed on a cylinder head, connected to each other via a communication passage. The cooling water flowing in from an inlet of the block jacket flows into an inlet port of the flow path switching valve from an outlet of the head jacket via the communication passage. An inflow barrier plate is provided, which closes a part of a leak path side of the inlet port to suppress an inflow of the cooling water from the block jacket via a leak path made in the cylinder block and the cylinder head.

13 Claims, 12 Drawing Sheets

FIG. 4 COMPARATIVE EXAMPLE

FLOW PATH SWITCHING VALVE

CROSS REFERENCE TO RELATED APPLICATION

The present application is based on and claims the benefit of priority of Japanese Patent Application No. 2021-048304, filed on Mar. 23, 2021, the disclosure of which is incorporated herein by reference.

TECHNICAL FIELD

The present disclosure generally relates to a flow path switching valve.

BACKGROUND ART

Conventionally, a flow path switching valve that switches a flow path of a cooling water of a water cooling system of an engine (i.e., an engine water cooling system hereafter) by an operation of the valve is known.

SUMMARY

It is an object of the present disclosure to provide a flow path switching valve that suppresses a decrease in cooling efficiency even when a leak path communicating from a block jacket to an inlet port is made.

BRIEF DESCRIPTION OF DRAWINGS

Objects, features, and advantages of the present disclosure will become more apparent from the following detailed description made with reference to the accompanying drawings, in which.

DETAILED DESCRIPTION

Figure 1:
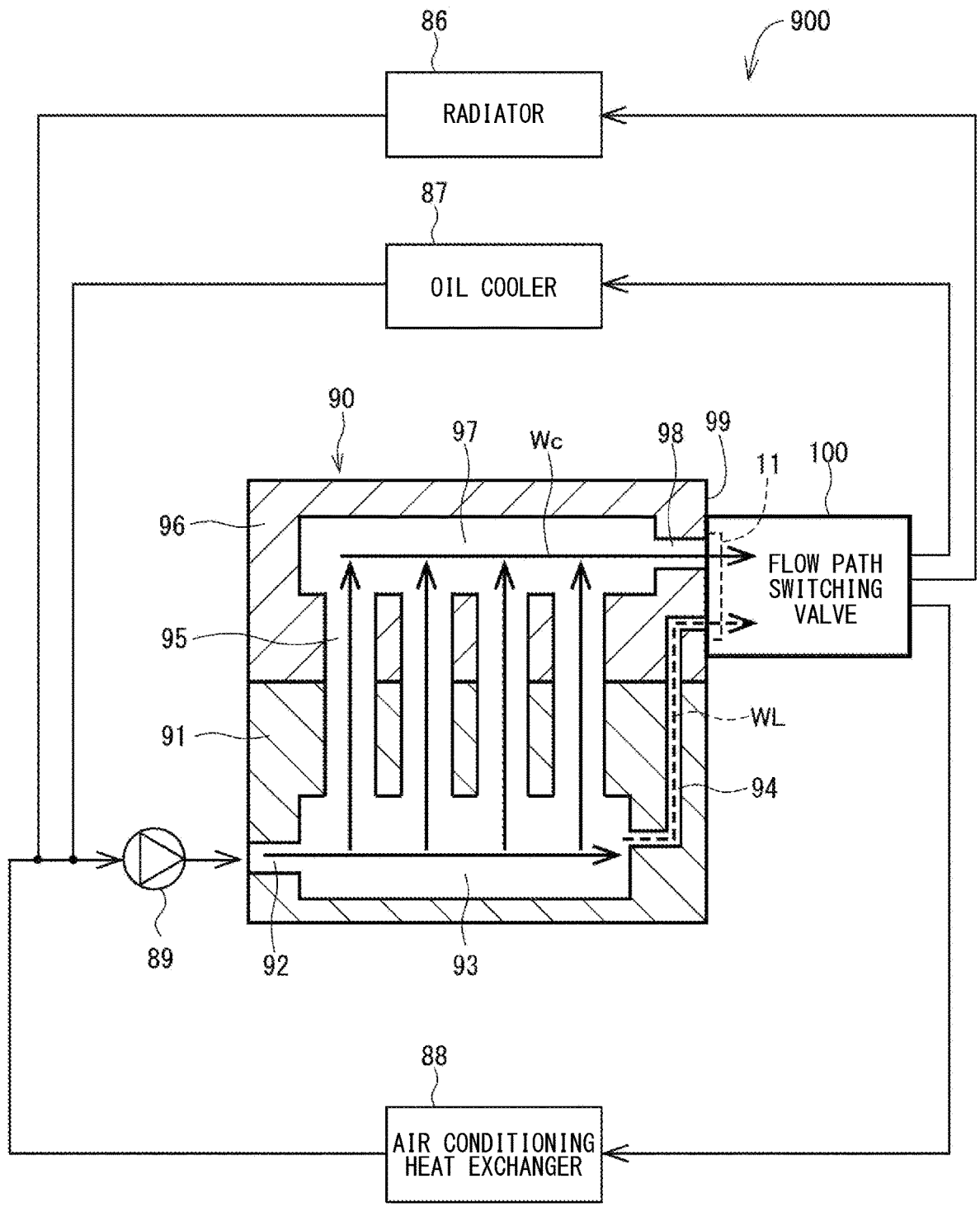
FIG. 1 is a configuration diagram of an engine cooling system including a flow path switching valve according to an embodiment.

Hereinafter, a plurality of embodiments of a flow path switching valve according to the present disclosure are be described with reference to the drawings. Substantially the same configurations in the plurality of embodiments are designated by the same reference numerals and the description thereof may be omitted. The following first to fifth embodiments may be collectively referred to as "the present embodiments." The flow path switching valve of the present embodiment is mounted on a mounting surface of an engine, and switches a flow path of a cooling water in an engine water cooling system by the operation of the valve. The basic use and function of the flow path switching valve are the same as those disclosed in Patent Document 1 (Japanese Unexamined Patent Publication No. 2018-54122).

[Engine Cooling System]

First, a configuration of the engine cooling system is described with reference to FIG. 1. An engine 90 includes a cylinder block 91 installed in a lower part and a cylinder head 96 installed in an upper part. A block jacket 93, which is a water jacket, is formed on the cylinder block 91. A head jacket 97, which is another water jacket, is formed on the cylinder head 96. The block jacket 93 and the head jacket 97 are connected to each other via a (main or vertical) communication passages 95.

In the cylinder head 96, a flow path switching valve 100 for switching a flow path of a cooling water in an engine cooling system 900 by the operation of the valve is mounted on a mounting surface 99 of the engine 90. As shown by a solid arrow, a (main or primary) cooling water Wc flowing in from an inlet 92 of the block jacket 93 flows into an inlet port 11 of the flow path switching valve 100 from an outlet 98 of the head jacket 97 via the communication passage 95. When the cooling water Wc passes through the cylinder block 91 and the cylinder head 96, the temperature of the cooling water Wc rises due to heat exchange with the engine 90.

The engine cooling system 900 includes a radiator 86, an oil cooler 87, an air-conditioning heat exchanger 88, a water pump 89, and the like. The flow path switching valve 100 switches the flow path for supplying the cooling water to the radiator 86, the oil cooler 87, and the air-conditioning heat exchanger 88. In the radiator 86, heat is released from the cooling water whose temperature has risen. The oil cooler 87 cools a lubricating oil. In the air-conditioning heat exchanger 88, heat exchange for heating vehicle interior air is performed. The cooling water discharged from the radiator 86, the oil cooler 87, and the air-conditioning heat exchanger 88 is recirculated to the block jacket 93 of the engine 90 by the water pump 89.

Now, due to manufacturing factors of the engine 90 such as cavities and core structure in the casting process, a leak path 94 that communicates directly from the block jacket 93 to the inlet port 11 of the flow path switching valve 100 may unintentionally be made. In such case, as shown by a broken line arrow, a cooling water WL flows from the block jacket 93 via the leak path 94 into the inlet port 11 of the flow path switching valve 100. Hereinafter, when distinguishing from where the cooling water flows into the flow path switching valve 100, the (main) cooling water from the head jacket 97 is labeled with "Wc" and the (leakage) cooling water from the leak path 94 is labeled with "WL." To avoid misreading a lowercase "l (el)" as the number "1," use an uppercase "L" in "WL."

If a part of the low-temperature cooling water that should flow to the cylinder head 96 flows through the leak path 94, the cooling efficiency of the cylinder head 96 lowers. Further, if the low-temperature cooling water is supplied from the flow path switching valve 100 to the air-conditioning heat exchanger 88, the heating performance may also lower/deteriorate. In response to such a situation, apart from the measures to prevent an inadvertent formation of the leak path 94 on the engine 90, in the present embodiment, a focus is put of prevention/suppression of the inflow of the cooling water WL from the leak path 94, from the viewpoint of the flow path switching valve 100.

[Flow Path Switching Valve]

Figure 2:
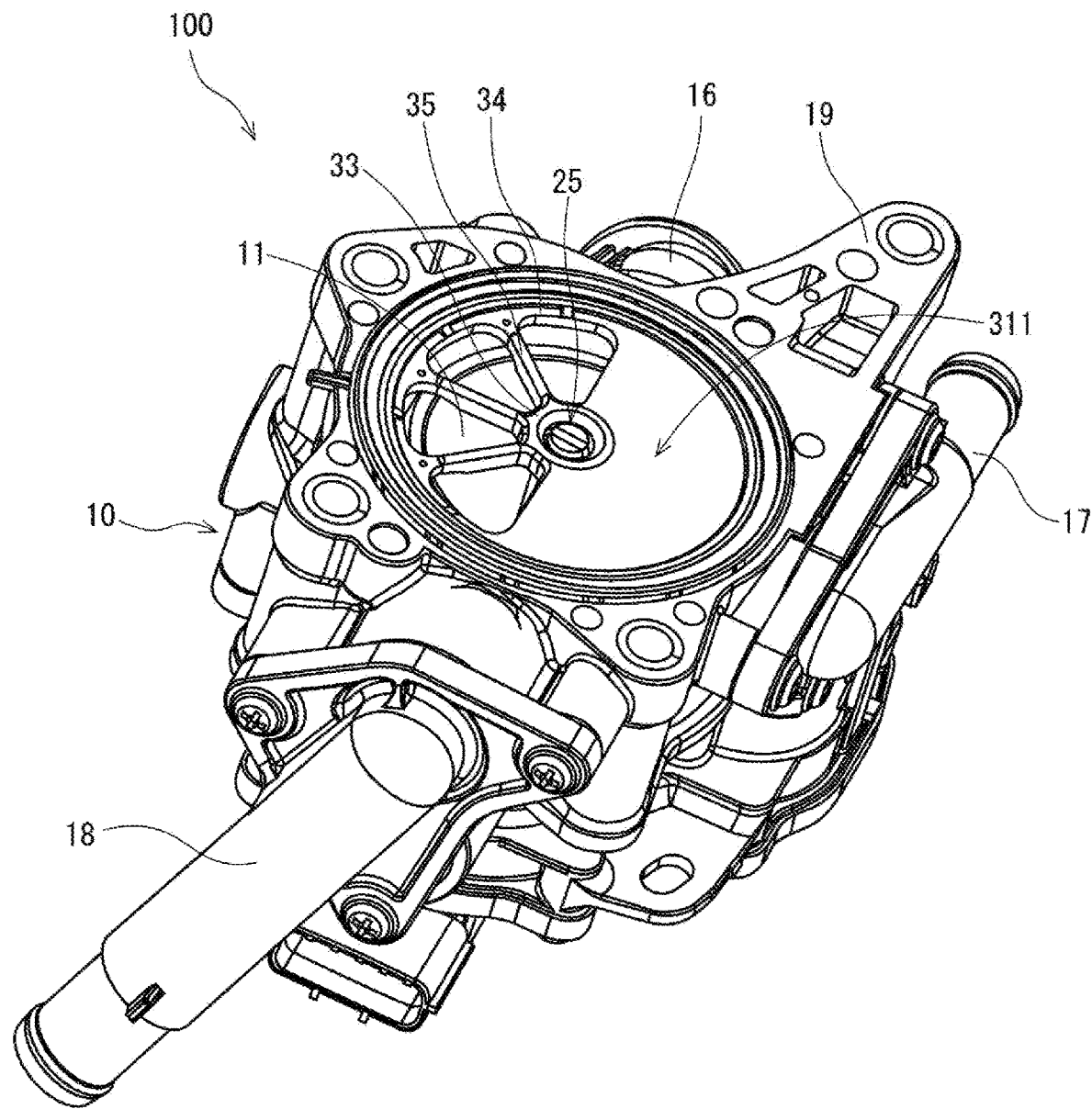
FIG. 2 is a perspective view of the flow path switching valve according to the embodiment.
Figure 3:
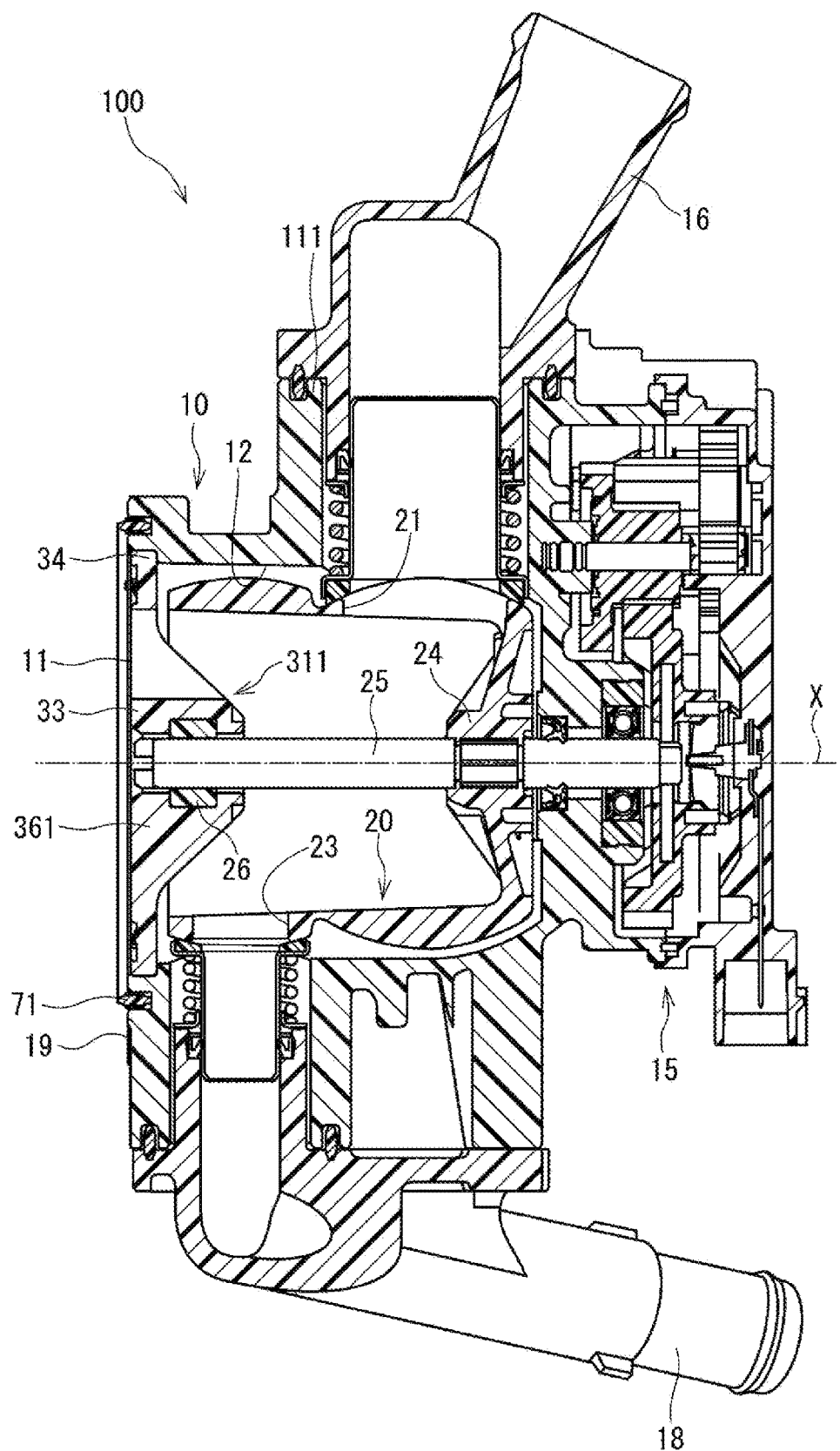
FIG. 3 is a cross-sectional view of the flow path switching valve according to the embodiment.

Next, with reference to FIGS. 2 and 3, the basic configuration of the flow path switching valve 100 common to each of the following embodiments is described. FIG. 2 is a perspective view corresponding to FIG. 16 of the Patent Document 1, and FIG. 3 is an axial sectional view corresponding to FIG. 1 of the Patent Document 1. Note that an orientation of a piping nipple and a wiring connector in the cross-sectional view is adjusted for convenience of illustration. In FIGS. 2 and 3, a shape of a bearing member 311 of the first embodiment is shown as a bearing member, and a reference numeral "311" is attached to the bearing member of the first embodiment. However, specific matters of the first embodiment are not mentioned here, which are described later with reference to FIGS. 5 and 6.

The flow path switching valve 100 of the present embodiment is a valve having a structure in which a valve body 20 is rotated to switch the flow path of the cooling water. Details of switching are discussed in a later section. The flow path switching valve 100 includes a housing 10, the valve body 20, a shaft 25, a bearing member 311 and the like. The housing 10 is made of resin and has a valve body housing portion 12 that has an opening on a surface that provides an engine mounting portion 19. On one side opposite to an opening of the valve body housing portion 12, a rotation drive unit 15 for rotating the valve body 20 is provided. A radiator piping nipple 16, an oil cooler piping nipple 17 (shown in FIG. 2, but not shown in FIG. 3), and an air-conditioning piping nipple 18 are provided on an outside (e.g., on an outer surface) of the housing 10. An annular gasket 71, which is a sealing member, is attached around the opening of the valve body housing portion 12 in the engine mounting portion 19.

The valve body 20 is formed of resin in a substantially bottomed cylinder shape, and is rotatably housed in the valve body housing portion 12 about a valve axis X. A cylinder wall of the valve body 20 has, formed thereon, a communication hole 21 that communicates with a radiator pipe, a communication hole 23 that communicates with an air-conditioning pipe (as shown in FIG. 3), and a communication hole (not shown) that communicates with an oil cooler pipe. A shaft 25 forming a rotation axis of the valve body 20 is insert-molded on a bottom 24 of the valve body 20. When the rotation drive unit 15 rotates the shaft 25 to a desired position, positions of the communication holes 21 and 23 and each of the pipes match, thereby allowing the cooling water in the valve body 20 to flow out to those pipes. In FIG. 3, for convenience of illustration, the (radiator) communication hole 21 communicates with (is aligned with) the radiator piping nipple 16, and the (air conditioning) communication hole 23 simultaneously communicates with (is aligned with) the air-conditioning piping nipple 18. In another embodiment (not shown), the communication holes 21 and 23 are actually put in communication with the pipe alternately as the valve body 20 rotates. In another embodiment (not shown), proportional control is provided as the valve body 20 rotates, for example 25% of the flow to the radiator piping nipple 18, and 50% to the air-conditioning nipple 18, and 25% to the oil cooler piping nipple 17 in a first rotation position. Additionally, there may be a rotation position (not shown) where little or no cooling water leaves the engine (when the engine is cold). Historically a mechanical temperature sensitive valve performed this cold engine blocking function.

The bearing member 311 is made of resin and is provided coaxially with the valve axis X at an end on an engine mounting portion 19 side to cover an opening of the valve body 20. The bearing member 311 bears one end of the shaft 25 by a bearing 26 provided in a central hole thereof. The bearing member 311 is provided with a plurality of ribs 35 that radially connect a central portion 33 and a peripheral portion 34. A space between the adjacent ribs 35 serves as the inlet port 11 into which the cooling water Wc flows from the head jacket 97. An engine-side surface of the bearing member 311 may serve as an (integral) inflow barrier plate 361 (see FIGS. 3, 5, and 6) that is an integral part of the bearing member 311. Alternatively, the (distinct) inflow barrier plate 402 in FIG. 8 may be distinct from the bearing member 322 (see the second embodiment in FIG. 8, and the third embodiment in FIG. 9).

Subsequently, with reference to FIG. 4, a state in which a flow path switching valve 109 of a comparative example is attached to the mounting surface 99 of the engine 90 is shown. The basic configuration of the flow path switching valve 109 is schematically shown by simplifying the configuration shown in FIG. 3. With the flow path switching valve 109 attached to the engine 90, the cooling water Wc flows from an outlet 98 of the head jacket 97 through the inlet port 11 formed between the ribs 35 of the bearing member 311 to an inside of the valve body 20. The gasket 71 set in a gasket groove 197 of the engine mounting portion 19 prevents the cooling water from leaking from the mounting surface 99 to the outside.

Figure 4:
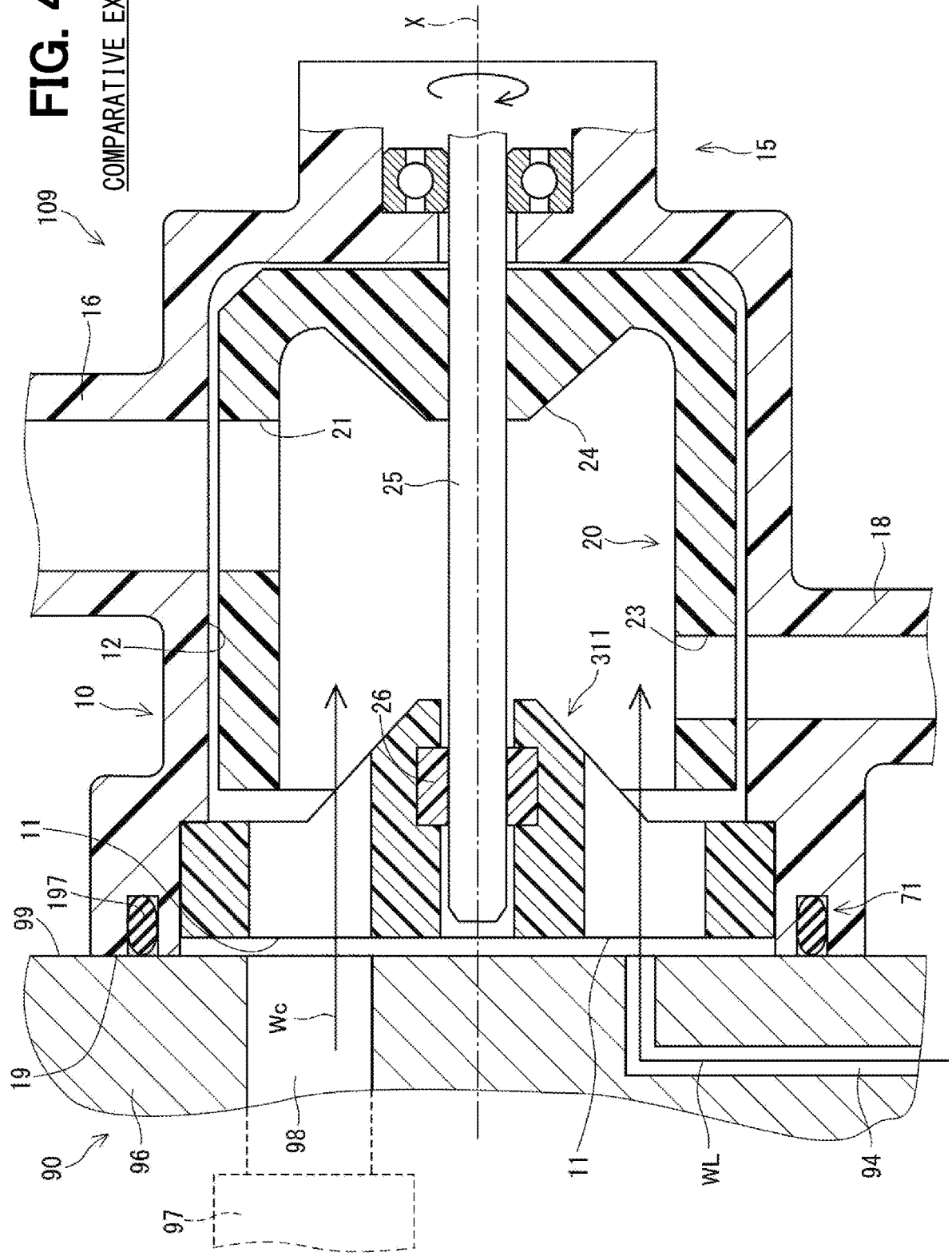
FIG. 4 is a schematic cross-sectional view of the flow path switching valve of a comparative example.

In FIG. 4, the flow path switching valve 109 of the comparative example corresponds to the valve device of the Patent Document 1, and does not have an inflow barrier plate of the present embodiments. Therefore, the cooling water WL from the leak path 94 also flows into the valve body 20 through the inlet port 11 formed between the ribs 35 of the bearing member 311. As a result, as described above, the cooling efficiency of the cylinder head 96 may be lowered and the heating performance may be lowered.

Therefore, the flow path switching valve 100 of the present embodiment has an inflow barrier plate provided to block a part of a leak path 94 side of the inlet port 11, for preventing/suppressing the cooling water from flowing into the inlet port 11 via the leak path 94.

[Inflow Barrier Plate]

In the following, with reference to FIGS. 5 to 12, the configuration of an inflow barrier plate in the flow path switching valve of the first to fifth embodiments is described. The inflow barrier plate in the following embodiments is classified/distinguished as to <1> whether a gasket is provided as "a seal member that separates a space on a head jacket 97 side from a space on a leak path 94 side," and <2> whether the inflow barrier plate is provided integrally with the bearing member or is separately provided therefrom (i.e., whether it has one-body structure with the bearing member or it as a separate body). The numeral of the flow path switching valve of each of the following embodiments is the number of the embodiment as the third digit following "10." Further, the third digit number of the numeral of the inflow barrier plate of each of the following embodiments corresponds to the number of the embodiment. For example, FIG. 6 (first embodiment) shows a flow path switching valve 101, and a bearing member 311. Also, FIG. 8 (second embodiment) shows a flow path switching valve 102, and a bearing member 322.

The view of the inflow barrier plate of each of the following embodiments is shown as a front view seen from an outlet 98 side of the head jacket 97 and as a schematic cross-sectional view in a valve axis X direction. However, a front view is omitted for the third and fifth embodiments. In the schematic cross-sectional view, a portion other than a periphery of the inlet port 11 of the housing 10 and the valve body 20 are omitted with respect to the comparative example in FIG. 4.

For convenience, in FIGS. 5 to 12, a portion shown above the valve axis X may be referred to as an "upper half," and a portion shown below the valve axis X may be referred to as a "lower half". The upper half of each of the schematic cross-sectional views shows a cross section of a portion of the bearing member not at/including the rib 35. The lower half of FIG. 8 in the second embodiment shows a cross section of a portion of the rib 35 of the bearing member.

Figure 5:
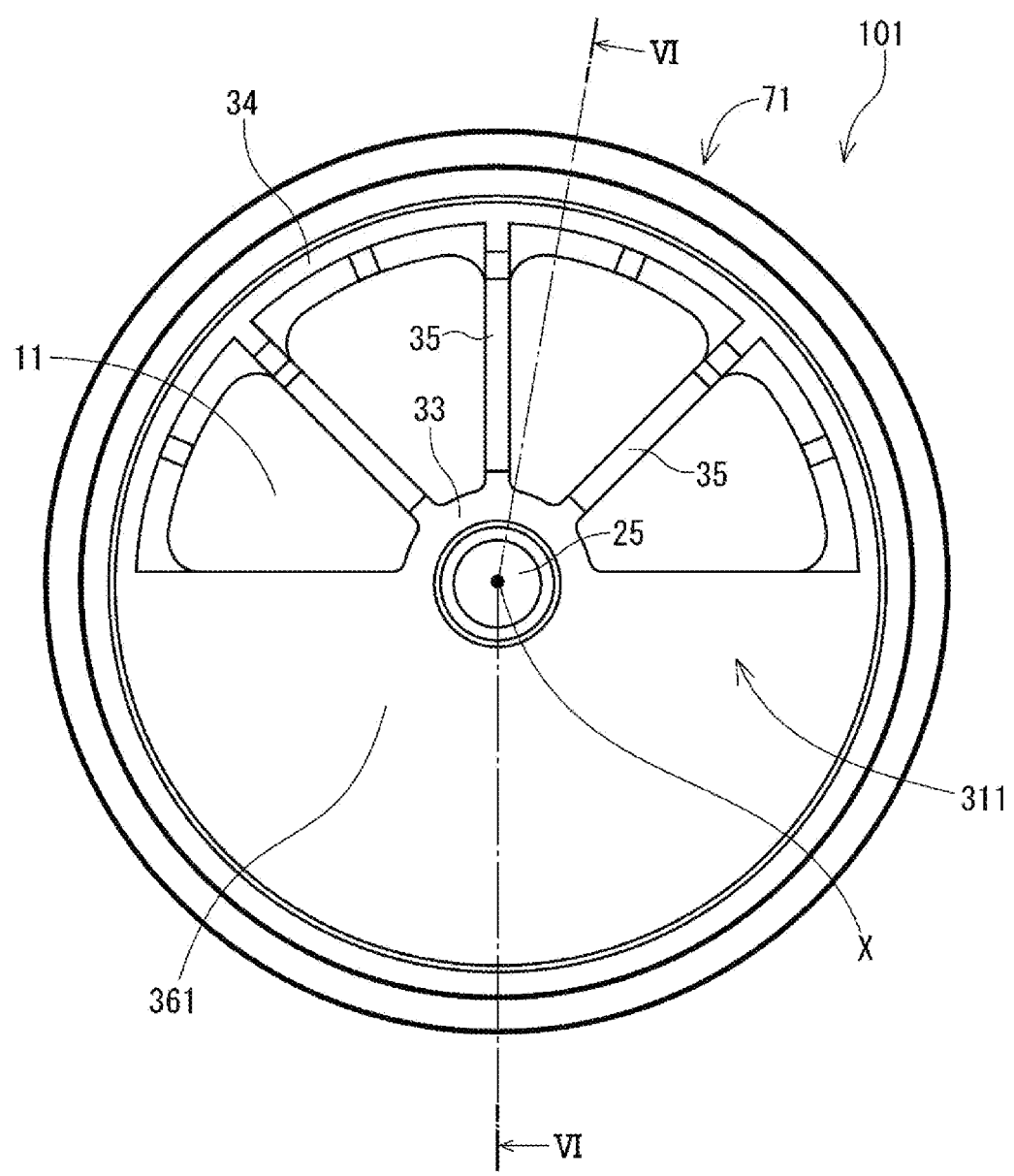
FIG. 5 is a front view of an inlet port portion of the flow path switching valve according to a first embodiment.
Figure 6:
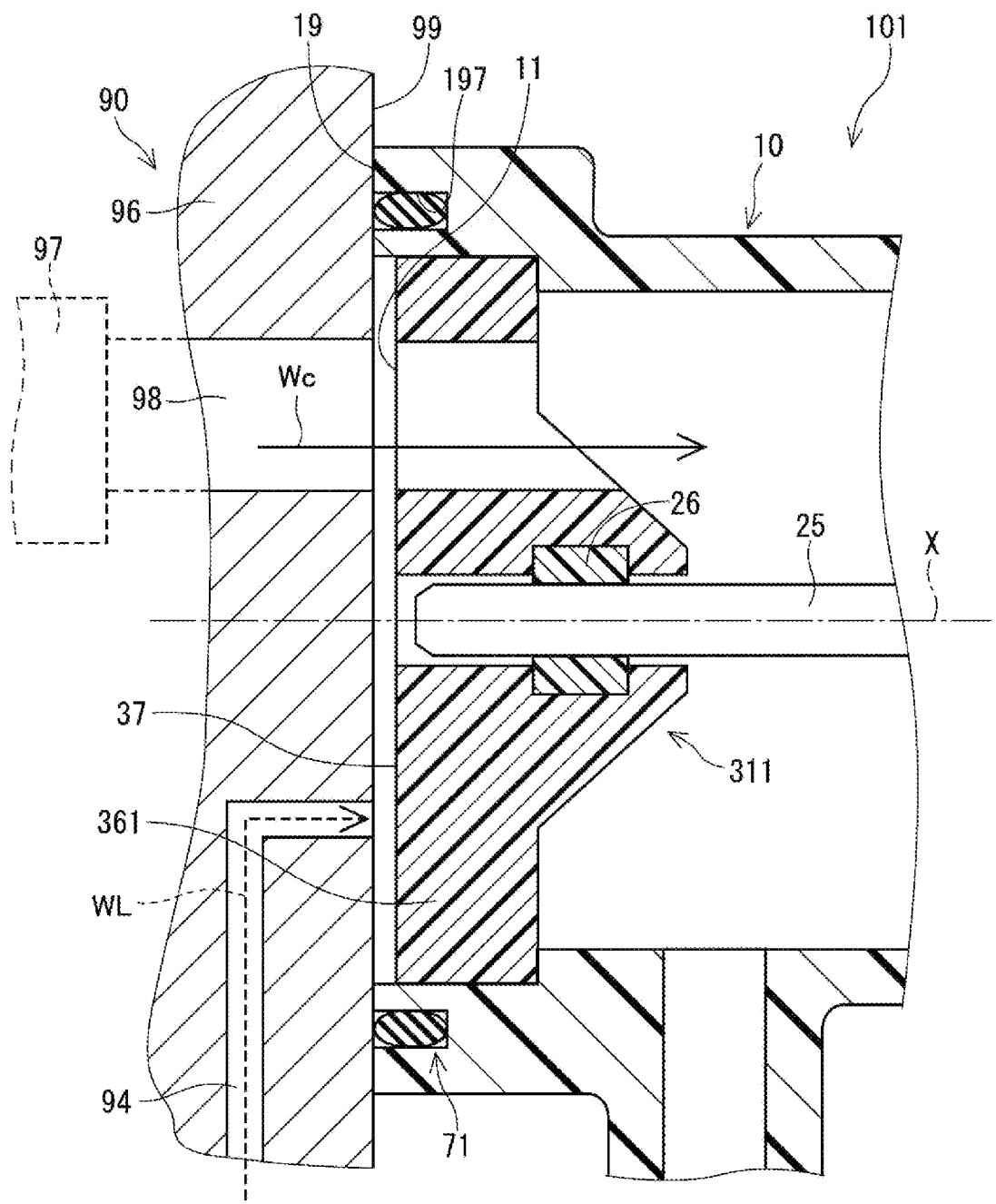
FIG. 6 is a schematic cross-sectional view taken along a VI-VI line of FIG. 5.

First Embodiment, FIGS. 5, 6

A flow path switching valve 101 of the first embodiment is described with reference to FIGS. 5 and 6. An (integral) inflow barrier plate 361 (also known as an inflow barrier "surface" for integral embodiments) of the first embodiment is provided integrally with the bearing member 311, both made of resin. In the first embodiment, the bearing function of the bearing member 311 bearing one end of the shaft 25 by using the bearing 26 is the same as that of the comparative example shown in FIG. 4. However, the comparative example does NOT have any inflow barrier plate configured to restrict or block the leaked cooling water WL.

The bearing member 311 has a plurality of ribs 35 that radially connect the central portion 33 and the peripheral portion 34 in an upper half region which faces the outlet 98 of the head jacket 97. A space between the adjacent ribs 35 serves as an inlet port 11 into which the cooling water Wc flows from the head jacket 97. As shown by a solid line arrow (in FIG. 6), the cooling water Wc from the head jacket 97 flows into the inside of the housing 10 without a barrier.

Further, in the bearing member 311, a lower half region including a portion (surface) facing the leak path 94 forms a wall-shaped inflow barrier plate 361 without any holes. The inflow barrier plate 361 blocks a part of the inlet port 11 on a leak path 94 side to prevent the (leaked) cooling water WL from flowing in from the block jacket 93 via the leak path 94. A broken line arrow showing/representing the (leaked) cooling water WL in FIG. 6 indicates suppression of the inflow thereof. The suppression may be a complete blocking, or may for example reduce the (leaked) cooling water WL by 50% with respect to the comparative example. In FIG. 6, some very small amount of (leaked) cooling water WL may move vertically upward (through a small gap between the inflow barrier plate 361 and the mounting surface 99) and join the (main) cooling water Wc.

In other words, in the first embodiment, the leaked cooling water WL that has passed through the leak path 94 may pass through a gap between an end surface 37 of the inflow barrier plate 361 and the mounting surface 99 of the engine 90 to reach and leak into the inlet port 11 on a head jacket 97 side. However, in the present embodiment, the inflow of the leaked cooling water WL from the leak path 94 does not have to be completely blocked, as long as the inflow is relatively suppressed. "The inflow of the leaked cooling water WL from the leak path is suppressed" means that the leaked cooling water WL flow rate is reduced or stopped.

Thereby, in the present embodiments, even when the leak path 94 that allows communication from the block jacket 93 to the inlet port 11 is made due to the manufacturing factors of the engine 90, the inflow of the (leaked) cooling water WL to the flow path switching valve 101 via the leak path 94 is suppressed (reduced or blocked). Therefore, it is possible to suppress (i) a decrease in the cooling efficiency of the cylinder head 96 and (ii) a decrease in the heating performance of the air-conditioning heat exchanger 88. Note, it might be desired to intentionally permit some small amount of (leaked) cooling water WL to flow.

Further, in the first embodiment, since the inflow barrier plate 361 is provided integrally with the bearing member 311, the function of the inflow barrier plate can be realized with the minimum number of parts.

Second Embodiment

Figure 7:
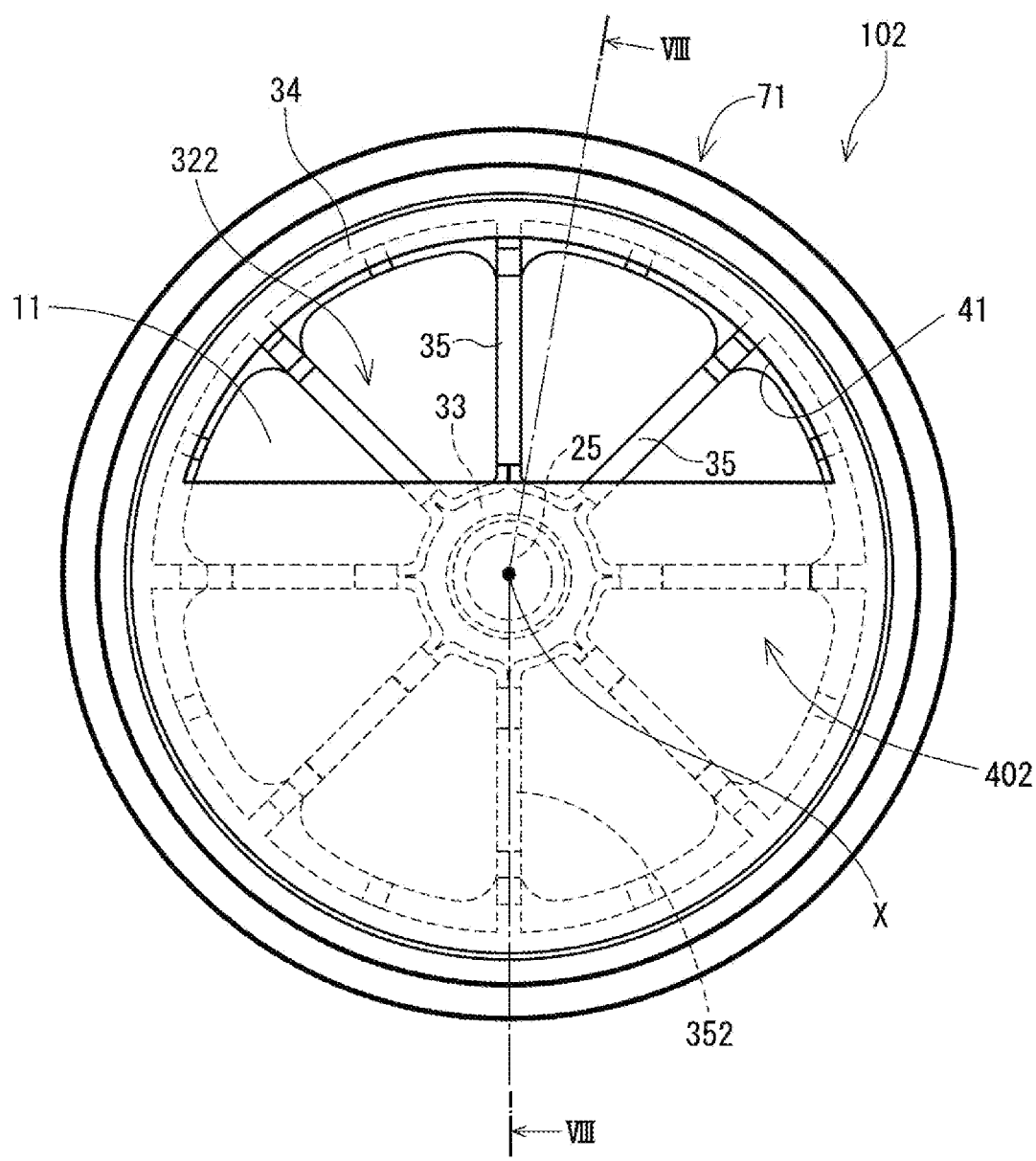
FIG. 7 is a front view of the inlet port portion of the flow path switching valve according to a second embodiment.
Figure 8:
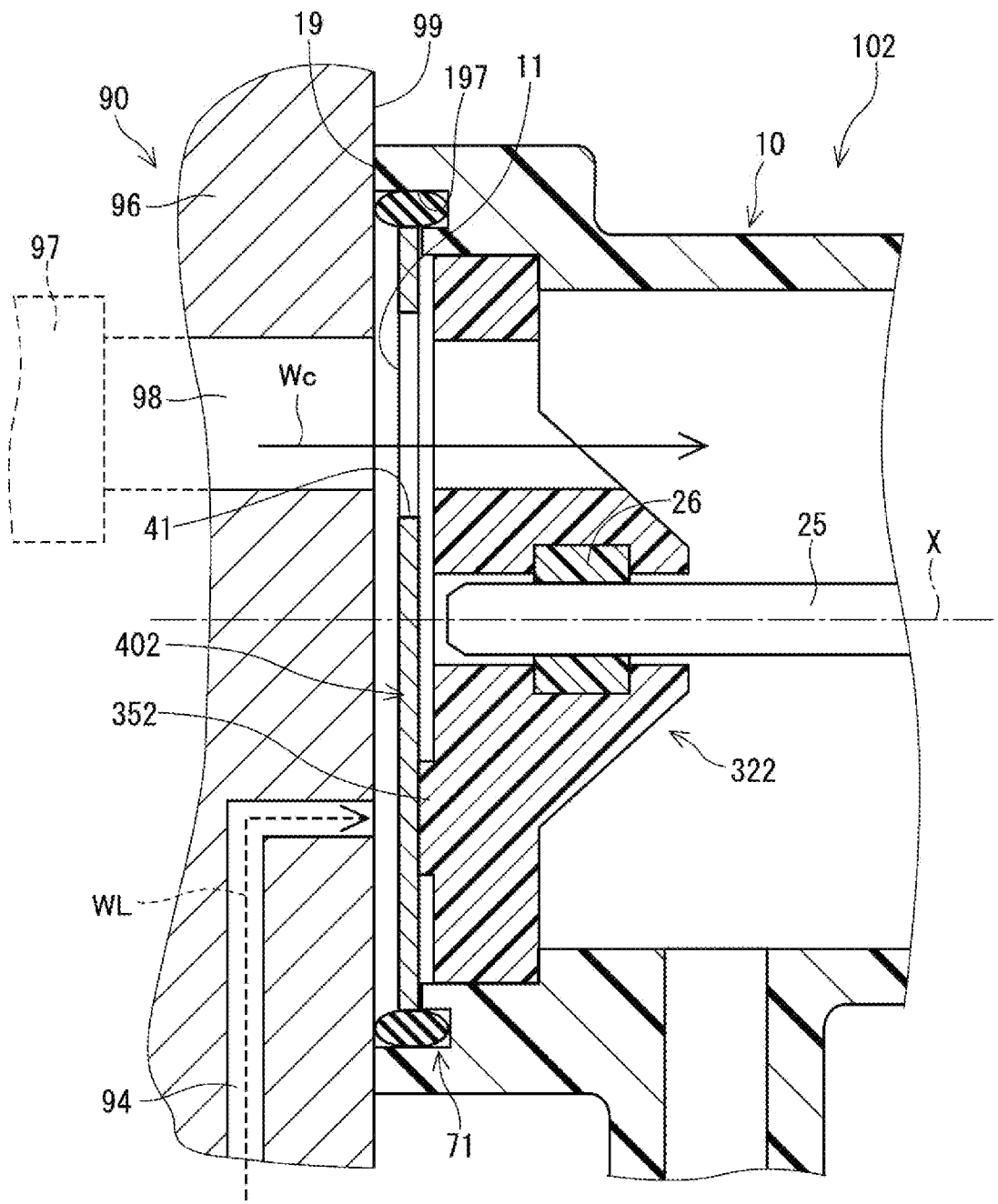
FIG. 8 is a schematic cross-sectional view taken along a VIII-VIII line of FIG. 7.

A flow path switching valve 102 of the second embodiment is described with reference to FIGS. 7 and 8. An inflow barrier plate 402 of the second embodiment is provided separately from a bearing member 322, and is preferably made of a metal plate such as stainless steel. As shown by a broken line in FIG. 7, the bearing member 322 has the ribs 35 provided radially in all directions (including downwardly). The (non-integral) bearing member 322 corresponds approximately to the configuration disclosed in FIG. 4 and the like of the Patent Document 1.

The inflow barrier plate 402 has a circular outer shape, and has a substantially semicircular window portion 41 that allows the cooling water to flow into the inlet port 11 from a head jacket 97 side. The inflow barrier plate 402 is adhered to, for example, an inner circumference of the gasket 71, or is insert-molded into the gasket 71. By mounting the gasket 71 in the gasket groove 197 of the housing 10, the inflow barrier plate 402 covers an end face of five of the ribs 35 of the bearing member 322, as shown in FIG. 7.

Here, for example, a step portion 352 that partially protrudes and comes into contact with the inflow barrier plate 402 may be formed on the end surface (engine-side surface) of the ribs 35 of the bearing member 322. By backing up (supporting or reinforcing) the inflow barrier plate 402 with a surface pressure of the step portions 352 of some of the ribs 35, it is possible to prevent the inflow barrier plate 402 from being deformed by water pressure. In the second embodiment, the inflow of the cooling water WL from the leak path 94 is suppressed as in the first embodiment. Further, the strength of the inflow barrier plate 402 is ensured by using metal to form the inflow barrier plate 402.

Furthermore, when repairing an existing flow path switching valve, it is possible to repair at low cost and in a short period of time by merely replacing the metal inflow barrier plate 402, and possibly the annular gasket 71 which may be integral with the inflow barrier plate 402.

Figure 9:
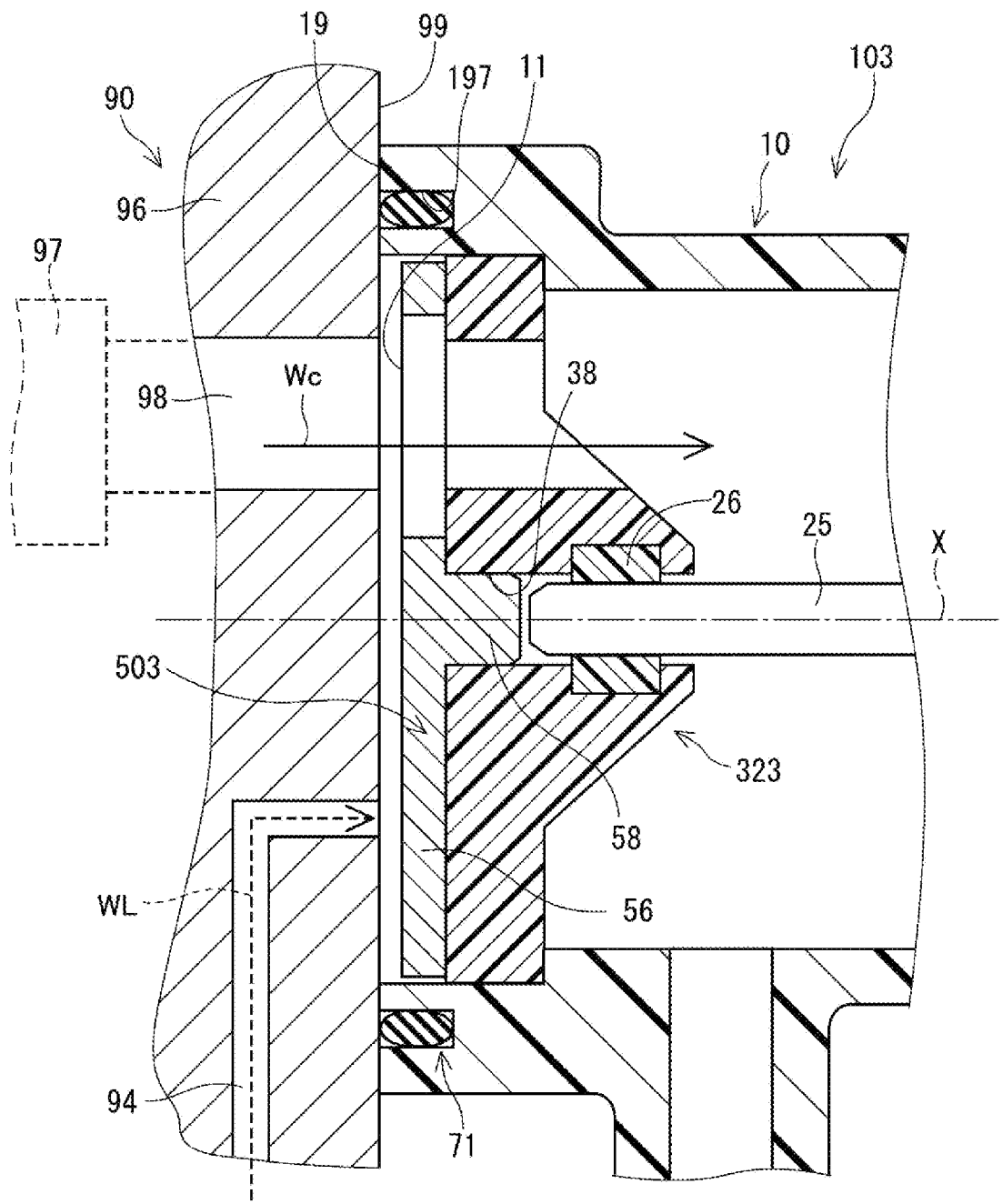
FIG. 9 is a schematic cross-sectional view of the inlet port portion of the flow path switching valve according to a third embodiment.

Third Embodiment, FIG. 9

A flow path switching valve 103 of the third embodiment is described with reference to FIG. 9. An inflow barrier plate 503 of the third embodiment is provided separately from a bearing member 323 made of a metal such as stainless steel or resin. Similar to the second embodiment, the bearing member 323 is provided with the ribs 35 (not shown in FIG. 9) radially extending in all directions. The inflow barrier plate 503 has a plate portion 56 that covers a lower half of the bearing member 323, and a fitting convex portion 58 that projects toward the bearing member 323 along the valve axis X. An outer diameter of the fitting convex portion 58 is set to be slightly larger than an inner diameter of a fitting hole 38 of the bearing member 323. The inflow barrier plate 503 is fixed by press-fitting the fitting convex portion 58 into the fitting hole 38 of the bearing member 323. Even with such configuration, the same effects as that of the second embodiment are obtainable. In the third embodiment of FIG. 9, the inflow barrier plate 503 does not necessarily contact the annular gasket 71.

Figure 10:
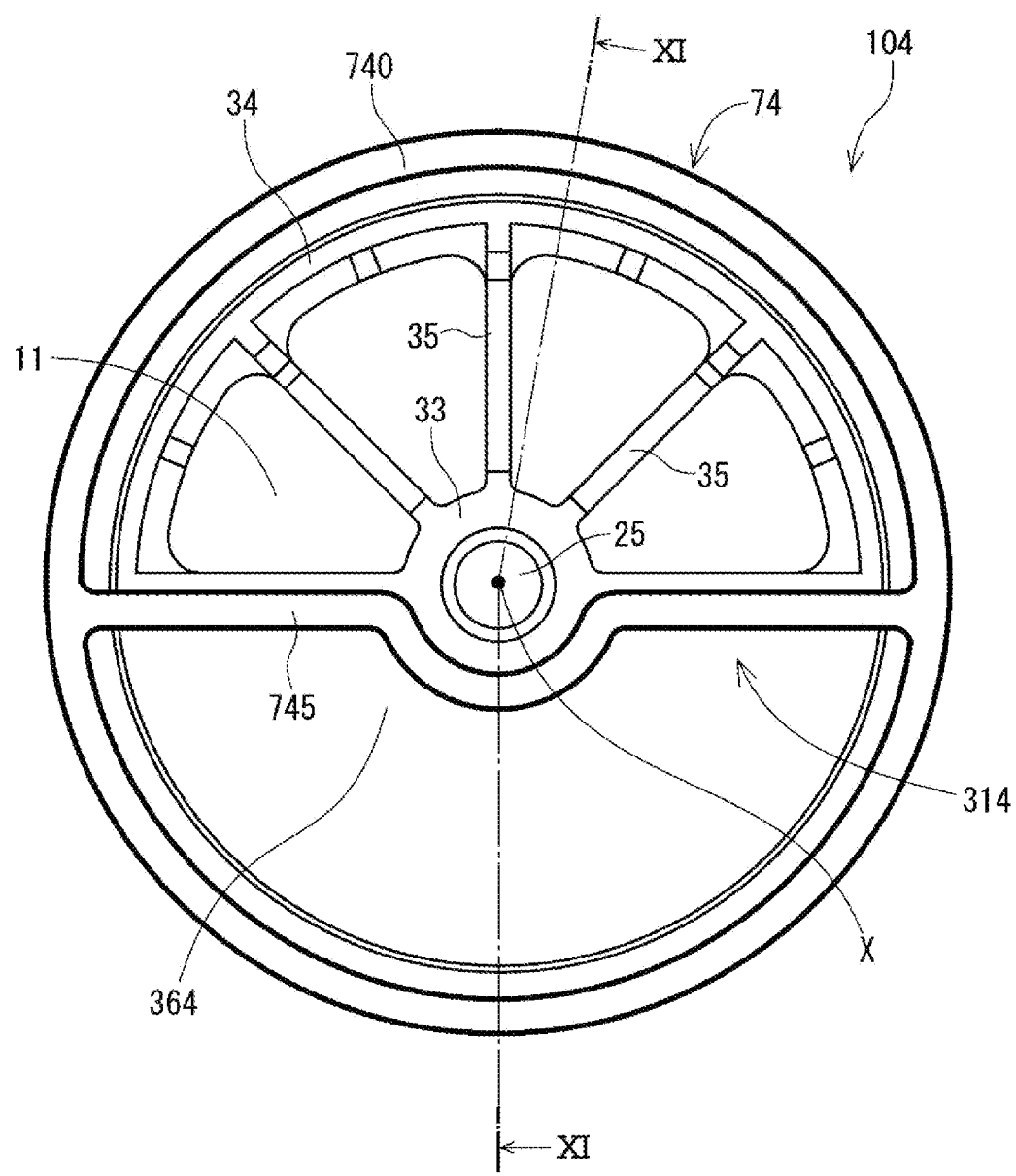
FIG. 10 is a front view of the inlet port portion of the flow path switching valve according to a fourth embodiment.
Figure 11:
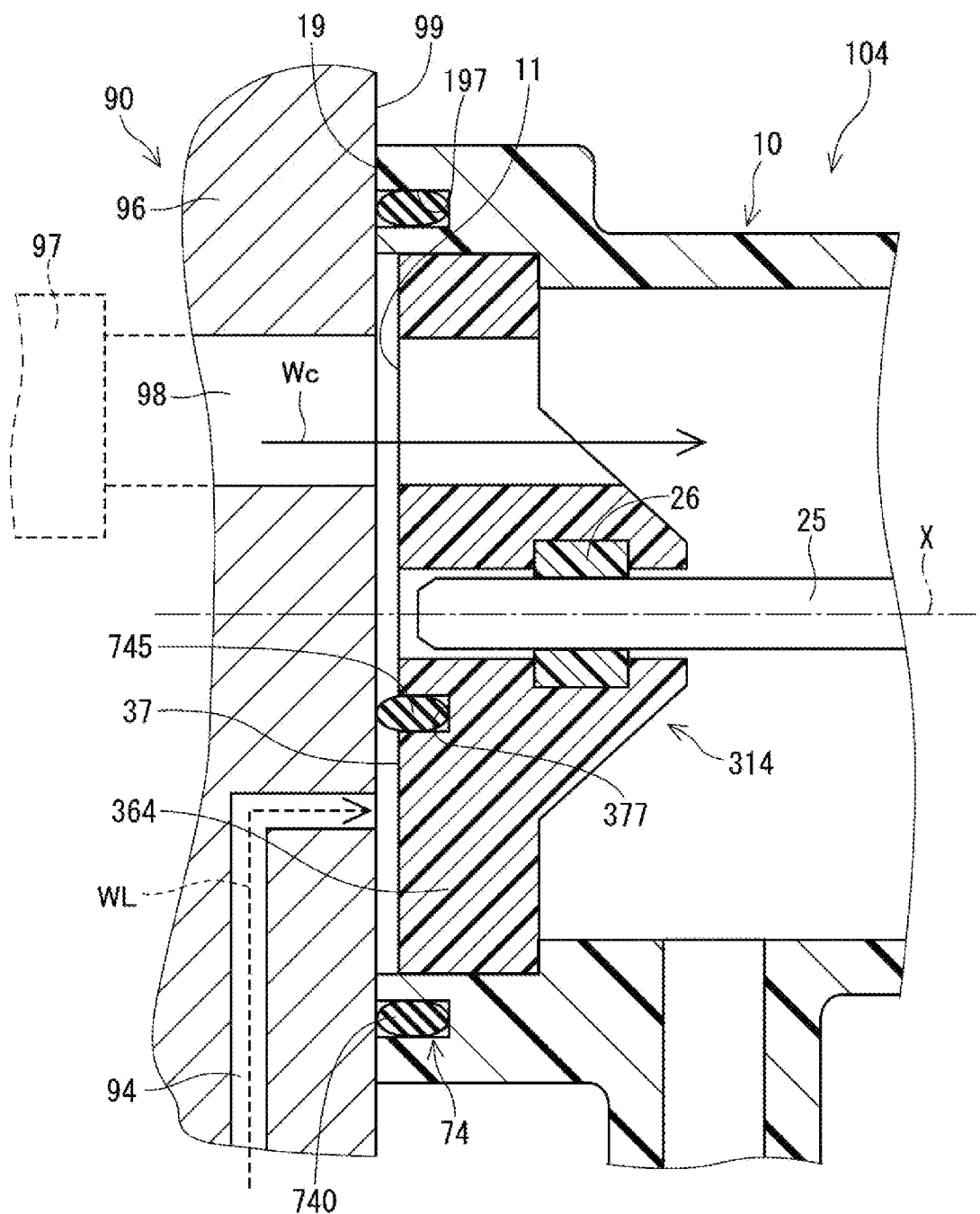
FIG. 11 is a schematic cross-sectional view taken along a XI-XI line of FIG. 10.

Fourth Embodiment, FIGS. 10 and 11

The fourth embodiment (FIGS. 10 and 11) is similar to the first embodiment (FIG. 6). The fourth embodiment adds a crossing portion 745 to the annular gasket 71 in order to greatly decrease (or terminate) the potential small vertically upward flow of the (leaked) cooling water WL in the gap between the bearing member 311 and the mounting surface 99 shown in FIG. 6.

A flow path switching valve 104 of the fourth embodiment is described with reference to FIGS. 10 and 11. An inflow barrier plate 364 of the fourth embodiment is provided integrally with a bearing member 314 made of resin, similarly to the inflow barrier plate 361 of the first embodiment. Further, in the inflow barrier plate 364 of the fourth embodiment, a gasket groove 377 is formed on the end surface 37.

The gasket 74 used in the fourth embodiment has a "θ shape" having a ring portion 740 and a crossing portion 745 connecting/bridging opposite portions in the ring portion 740. The ring portion 740 of the gasket 74 is mounted in the gasket groove 197 of the housing 10, and the crossing portion 745 of the gasket 74 is mounted in the gasket groove 377 of the inflow barrier plate 364. The crossing portion 745 of the gasket 74 separates a space allowing communication from the head jacket 97 to the inlet port 11 and a space allowing communication from the leak path 94 to the inlet port 11. As a result, the inflow of the cooling water WL from the leak path 94 is further suppressible.

Figure 12:
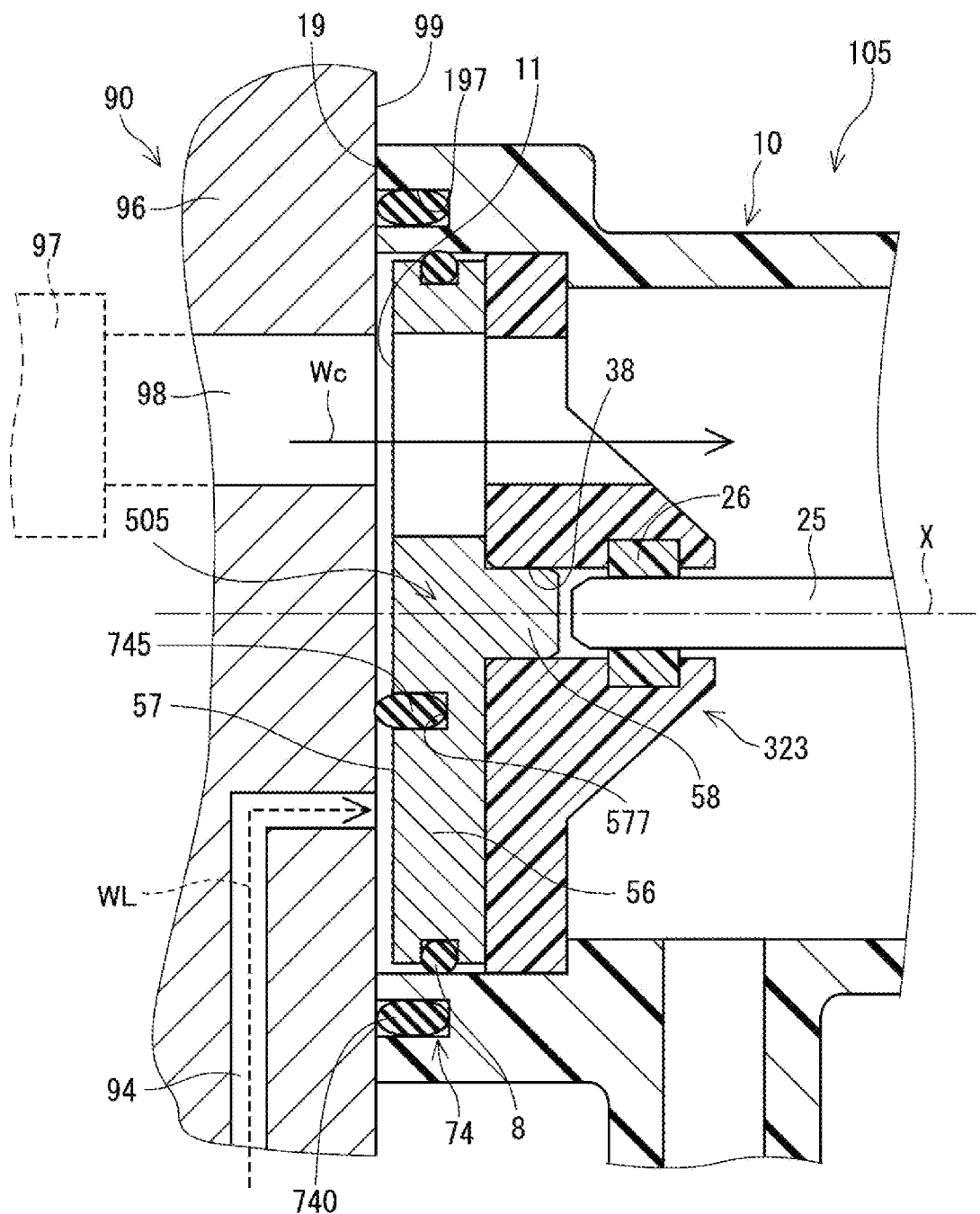
FIG. 12 is a schematic cross-sectional view of the inlet port portion of the flow path switching valve according to a fifth embodiment.

Fifth Embodiment, FIG. 12

A flow path switching valve 105 of the fifth embodiment is described with reference to FIG. 12. Like the inflow barrier plate 503 of the third embodiment, an inflow barrier plate 505 of the fifth embodiment is provided separately from the bearing member 323 made of a metal such as stainless steel or resin. The inflow barrier plate 505 is fixed by press-fitting the fitting convex portion 58 into the fitting hole 38 of the bearing member 323.

Further, the inflow barrier plate 505 of the fifth embodiment has a relatively thick plate thickness, and a gasket groove 577 is formed on an end face 57. The θ-shape gasket 74 is mounted in the gasket groove 577, just like the fourth embodiment. Thereby, the same effects as those of the fourth embodiment are achievable. Further, an O-ring 8 may be provided on an outer periphery of the inflow barrier plate 505.

Other Embodiments (A) The structure of the flow path switching valve is not limited to the one in which a method of switching the flow path of the cooling water by rotating the valve body 20, and may also be implemented by any method such as a slide method or the like, as long as the method is capable of switching the flow path. In addition, the number of flow paths to be switched and the type of target device to which the cooling water is supplied via each flow path are not limited.

(B) The leak path 94 caused by the manufacturing factors is not limited to one path, which may be made as a plurality of paths. In addition, a portion where the leak path 94 is made may vary engine 90 to engine 90. In view of such a realistic situation, the inflow barrier plate of the present disclosure does not have to cover all the leak paths 94, but may be provided to cover only a part of the leak paths 94 having a large amount of leak, for a suppression/reduction of the total amount of inflow of the cooling water.

As described above, the present disclosure is not limited to the above embodiments, but is implementable in various forms without diverting from the gist thereof.

What is claimed is:

1. A flow path switching valve configured for use in an engine water cooling system, configured for mounting on a mounting surface of an engine, and configured for switching a flow path of a cooling water by an operation of the flow path switching valve, the engine water cooling system having: a block jacket, which is a water jacket formed on a cylinder block, and a head jacket, which is a water jacket formed on a cylinder head, the block jacket and the head jacket are connected via a communication passage, the flow path switching valve configured as follows:

the cooling water flowing in from an inlet of the block jacket flows into an inlet port of the flow path switching valve from an outlet of the head jacket via the communication passage, and the flow path switching valve has an inflow barrier plate provided therein that closes a part of a leak path side at the inlet port to suppress an inflow of the cooling water from the block jacket via a leak path made in the cylinder block and the cylinder head.

2. The flow path switching valve of claim 1, wherein a seal member is provided at a position between an end face of the inflow barrier plate and the mounting surface of the engine, the seal member separating a space that allows communication from the head jacket to the inlet port and a space that allows communication from the leak path to the inlet port.

3. The flow path switching valve of claim 1, wherein the flow path switching valve switches the flow path of the cooling water by rotating a valve body, and the inflow barrier plate is provided integrally with a bearing member that bears one end of a shaft that serves as a rotation shaft of the valve body.

4. The flow path switching valve of claim 1, wherein the flow path switching valve switches the flow path of the cooling water by rotating a valve body, and the inflow barrier plate is provided separately from a bearing member that bears one end of a shaft that serves as a rotation shaft of the valve body.

5. A flow path switching valve configured to mount to an engine, and comprising:
a housing configured to mount to a mounting surface of the engine;
a shaft;
a valve body configured to rotate about a valve axis;
a bearing member configured to hold a bearing and including:
(i) an inlet port configured to receive and pass unleaked cooling water from an outlet of a head jacket of the engine, such that the unleaked cooling water enters the valve body, and
(ii) an end surface facing the mounting surface, and wherein at least a portion of the end surface forms an inflow barrier plate that is an integral part of the bearing member, and wherein the inflow barrier plate is configured to suppress a flow of leaked cooling water into the valve body.

6. The flow path switching valve of claim 5, further comprising:

an annular gasket, wherein a circumference of the bearing member is configured to contact an inner surface of the housing, and wherein the housing includes a gasket groove that is open facing the engine mounting portion, and that is configured to hold the annular gasket.

7. The flow path switching valve of claim 6, wherein the bearing member includes:

a peripheral portion extending semi-circularly about the valve axis, a central portion, and at least three ribs extending radially outwardly from the central portion towards the peripheral portion.

8. A flow path switching valve configured to mount to an engine, and comprising:

a housing configured to mount to a mounting surface of the engine;

a shaft;

a valve body configured to rotate about a valve axis;

a bearing member configured to hold a bearing and including:

(i) a central portion, (ii) a circular peripheral portion, and (iii) ribs extending radially from the central portion to the circular peripheral portion, wherein the central portion, the circular peripheral portion, and the ribs define orifices; and an inflow barrier plate that is distinct from the bearing member, wherein the inflow barrier plat includes a substantially semi-circular window portion configured to receive and pass unleaked cooling water from an outlet of a head jacket of the engine, such that the unleaked cooling water further passes through at least one of the orifices and enters the valve body, and wherein the inflow barrier plate is configured to suppress leaked cooling water from entering the valve body.

9. The flow path switching valve of claim 8, wherein a circumferential outer surface of the bearing member and contacts a first inner surface of the housing, wherein a circumferential outer surface of the inflow barrier plate contacts or is integrally formed with an annular gasket, and wherein the annular gasket contacts a second inner surface of the housing.

10. The flow path switching valve of claim 9, wherein the first inner surface has a first diameter, wherein the second inner surface has a second diameter, and wherein the first diameter is smaller than the second diameter.

11. The flow path switching valve of claim 8, wherein at least some of the ribs include stepped portions extending towards the inflow barrier plate, and configured to at least partly support the inflow barrier plate.

12. The flow path switching valve of claim 11, wherein the housing includes a gasket groove shaped to hold the annular gasket, wherein the gasket groove is partially defined by a gasket groove inner wall, wherein the gasket groove inner wall has a radial internal surface with the first diameter, and has a radial external surface with the second diameter, wherein the gasket groove inner wall is configured to at least partly support the inflow barrier plate.

13. The flow path switching valve of claim 8, further comprising a crossing portion integrally formed with, or adjacent to, the annular gasket to form a θ-shaped gasket, and wherein the crossing portion is configured to suppress leaked cooling water from entering the valve body.

* * * * *